UNITED STATES PATENT OFFICE.

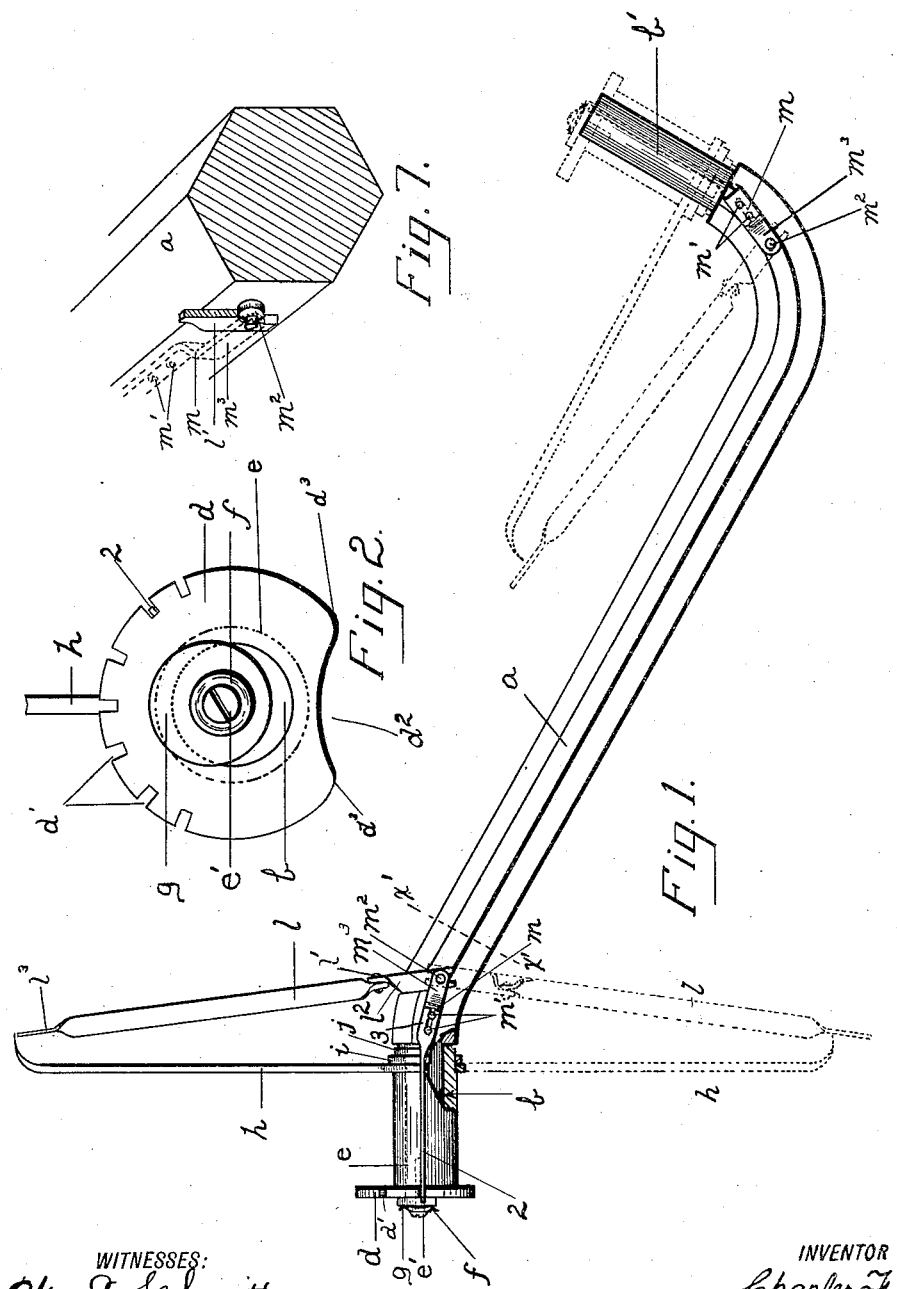

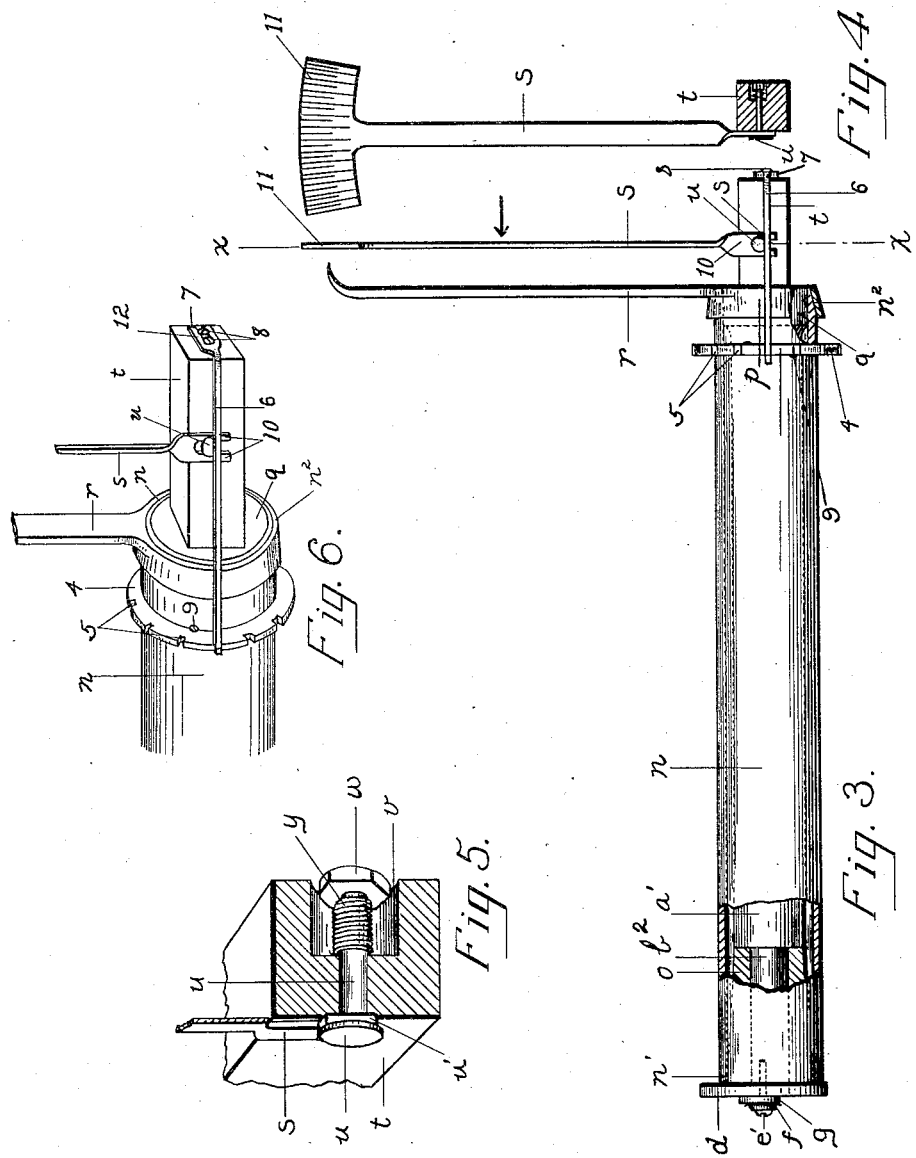

CHARLES FREDOLIN URBAN, OF MILWAUKEE, WISCONSIN.

TRUING-TOOL FOR LATHE-WORK.

1,082,714.  Specification of Letters Patent.  Patented Dec. 30, 1913.

Application filed April 8, 1912. Serial No. 689,442.

*To all whom it may concern:*

Be it known that I, CHARLES F. URBAN, a citizen of the United States, and a resident of the city of Milwaukee, county of Milwaukee, State of Wisconsin, have invented a new and useful Improvement in Truing-Tools for Lathe-Work, of which the following is a specification.

My invention relates to a tool or device to be rigidly clamped to the tool holder of a metal working machine for truing up machined work, such as turned, bored, faced or planed surfaces, in order to discover the irregularities of the surface, and to indicate the finishing necessary before the work will be true.

My device comprises a shank, the ends of which are formed to provide journal pins upon which the movable parts of the device are interchangeably mounted.

My device further comprises a rotatable gage plate to be placed in contact with the surface to be trued up, a dial and a pointer showing the rotations of the gage plate, and thus indicating the irregularities in the surface being trued up.

The shank of my device is rigidly clamped in place on the tool holder of a metal working machine, in such position as to cause the gage plate of the device to bear against the surface to be tested. If the surface of the work is not true, the degree of irregularities will be indicated on the dial of the device, and if, in applying the test, no deviation of the pointer is noticed from its zero or initial position on the dial, the work is shown to be perfect.

My invention further has for its special purpose the arranging of the working parts embodied in the device so as to operate accurately, also to so arrange my truing tool as a whole that it is adapted to be used in connection with all manner of work.

The construction, operation and special features of my device are best understood from a detailed description of the accompanying drawings constituting a part of this specification.

In such drawings: Figure 1 is a side elevation of my truing tool with parts broken away, the device here shown being of a type adapted for truing up surfaces either external or internal; on the right end of this figure are shown, in broken outline, the parts mounted on the left end of the shank to illustrate the changeability of said parts from one end to the other of the shank; Fig. 2 is an end elevation of my truing tool on a larger scale than shown in Fig. 1, more particularly showing what I term the gage plate, being a part of the sleeve rotatably mounted on the journal pin extremity of the shank of my tool, the sleeve also carrying the pointer by which the deviations from the true surface are indicated on the dial of my device; Fig. 3 is a side elevation, with parts broken away, showing my device arranged for use in truing up internal work of greater depth than would permit the use of the tool shown in Fig. 1; Fig. 4 is a cross section partly in elevation on the line $x$—$x$ of Fig. 3, looking in the direction pointed by the arrow, showing the dial removably secured to one side of the extremity of the shank of my device; Fig. 5 is a larger-scale sectional perspective, showing the means for detachably affixing the dial on my device of the type shown in Fig. 3; Fig. 6 is a perspective fragmental detail, drawn on a larger scale, of the right end of the device shown in Fig. 3; this view shows more clearly the manner in which the resilient arm restrains the movement of the gage plate; and Fig. 7 is a perspective view, on a larger scale, taken approximately on line $x'$—$x'$ of Fig. 1, looking toward the left, showing the form of construction of the means by which the dial bar is adjustably attached.

Referring in the first instance to the arrangement of my device as shown in Fig. 1: $a$ represents the shank, the ends $b$, $b'$ of which are formed to constitute journal pins and are bent in opposite directions at angles of 30 and 90 degrees, respectively, from the axis of the shank $a$, so as to adapt my truing tool to be conveniently used on work lying in planes of different angles. On the journal pins are removably mounted the devices by which irregularities of the surface are indicated. Such devices consist of a sleeve $e$, on the outer end of which is rigidly mounted a gage plate $d$, a front elevation of which is shown in Fig. 2, said gage plate being of circular form, except having a part $d^2$ cut away, so as to provide contact or bearing points, $d^3$, one of which, in practice, is caused to bear upon the surface being trued up. The periphery of the gage plate $d$ is formed with a plurality of radial slots, as $d'$, in which to receive the extremity of the resilient arm 2, which is removably fastened to the shank. The function of the resilient arm 2 is to permit the gage plate $d$ to follow the irregularities in the surface with which one of its bearing points, $d^3$, is in contact, and over which it is passing in the relative movement under it of the surface being trued. The gage plate $d$ being provided with a plurality of radial notches $d'$, as mentioned, the resilient arm 2 can be arranged as convenient. I find it convenient to affix the arm 2 as shown, viz: The arm 2 is provided with a forked end 3, adapted to be slipped under the heads of the screws $m'$ by which a bracket $m$ is fastened to the shank $a$. The bracket $m$ is made with a set out spring member $m^3$, adapted to clamp the forked end $l^2$ of the dial bar $l$ by pressure against same. The pin $m^2$ is rigidly set into the shank, $a$, (see Fig. 7) and has a reduced outer end which extends through a hole in the bracket $m$, thus the spring $m^3$ of said bracket $m$ will bear against the shoulder of the pin $m^2$. The forked end of the dial bar is slightly thicker than the distance between the shank, $a$, and the shoulder of the pin $m^2$, and the pressure of the spring member $m^3$ of the bracket $m$ against the dial bar will hold the latter in place. This construction facilitates instant insertion or removal of the dial bar without the use of auxiliary tools.

On the sleeve $e$ is adjustably mounted a pointer $h$, being movably held in place between the shoulder of the reduced end $j$ of the sleeve $e$ and a collar $i$ rigidly mounted on such reduced end. The dial bar $l$ is formed with a dial $l^3$ graduated on both faces; and the extremity of the pointer is bent so as to work over the periphery of the dial segment and facilitate its reading on either dial face. The outer portion of the dial bar $l$ is adjustable on a hinge pivot $l'$, as shown in Fig. 1, in order to permit the dial head to be arranged most conveniently to the work being done, and the pointer $h$ is made adjustable for the same purpose. The sleeve $e$ is rotatably held in place on the journal pin $b$ by a latch plate $g$, eccentrically secured on the extremity of the journal pin by a screw $e'$, bearing against a spring washer $f$, the parts being adapted to impose sufficient friction between the latch plate $g$ and the journal pin $b$, so that these parts will retain the same relative position, that is, the latch plate $g$ will not move from the position in which it is set, at the same time permitting the gage plate $d$, and therewith the sleeve $e$ on which it is mounted, to be rotated in following the irregularities in the surfaces of the work being trued up. The parts are further arranged to permit the latch plate $g$ to be adjusted substantially concentric with the bore of the sleeve, so that the latter may be dismounted from the journal pin $b$; the latch plate $g$ being slightly smaller in diameter than that of the bore of said sleeve $e$.

The operating parts of my truing tool may be mounted on either of the journal pins, $b$, $b'$, as convenient to the work being trued up, and by having formed said journal pins, $b$, $b'$, at the angles mentioned, respectively, my truing tool is adapted to all manner of work, internal and external, unless the internal work is of greater depth.

In connection with work of greater depth, I re-arrange my device as shown in Fig. 3. The device here illustrated comprises a cylindrical shank $a'$, one end of which is formed to constitute a journal pin $b^2$, the other end, $t$, being of rectangular cross-section, for clamping purposes. The end of the cylindrical shank adjacent to the clamping end is enlarged, as shown at $q$ in Fig. 3. The gage plate, $d$, is of the same shape as the one used in the device previously described, the radial slots, however, being omitted. The parts $e'$, $f$ and $g$ are identically the same as those heretofore described. The sleeve $o$ is rotatably mounted on the journal pin $b^2$, and is laterally tapered.

The cylindrical tube, $n$, is tapered externally at one end and internally at the other end. When the shank $a'$ and the sleeve $o$ are inserted in the tube $n$, the internal taper in one end of the latter, and the external taper of the sleeve $o$, contact to create a tight fit between these two parts. A circular ring, 4, containing in its periphery the radial slots 5, is mounted on the tube $n$, and is held rigidly in position by the set-screw 9. A pointer, $r$, is an integral part of the ring $n^2$, the latter being tapered internally, so that when mounted on the externally tapered end of the tube $n$, the contact between these two parts will cause a tight fit. The pointer $r$ may be turned to any convenient position, the tight fit retaining it in such position till a further adjustment is made.

Upon the clamping end, $t$, of the shank $a'$ is removably mounted a dial bar $s$. This dial bar has a forked end 10 and a dial 11. Both faces of the dial are graduated so as to facilitate reading. The means by which the dial bar is removably mounted are shown in Fig. 5, and are as follows: A threaded bolt, $u$, having a shoulder, $u'$, is inserted in a bore in the clamping end $t$. A counter bore, $v$, permits the insertion of a coil-spring $y$ about the shank of the bolt $u$, and a nut $w$ holds said spring in place. A tightening of the nut $w$ will compress the spring and draw the shoulder $u'$ firmly against the face of the clamping end $t$. Longitudinal pressure applied to the threaded end of the bolt will cause the bolt-head to stand out from the face of the clamping end $t$, and upon the removal of this pressure the spring will force the bolt back to its original position. The shoulder $u'$ is of such width that the forked end 10 of the dial bar will straddle it, and its thickness is slightly less than that of the dial bar, so that the head proper of the bolt will bear against the tines. Pressure applied by the reaction of the coil spring $y$ against the nut $w$ will cause the bolt-head to bear against the dial bar with enough pressure to hold the latter rigidly in position. This construction will allow instant removal or attachment, as desired. A resilient arm 6 having a forked end 12 is removably attached to the clamping end $t$ by the screws 8, as shown in Fig. 6. A bend in this arm will allow the same to run parallel to the shank of the instrument and at a distance from it sufficient to eliminate any chance of conflict between it and other parts of the instrument. The end of said arm 6, when inserted in one of the radial slots 5, will tend to hold the gage plate and the shank of the instrument in the same relative position.

When any irregularity in the work to be trued up causes the gage plate to vary from its initial position, the resilient arm 6 will bring it back at once, when the irregularity has been noted and passed over. The plurality of slots 5 will allow the initial position of the pointer to be wherever it is most convenient.

I claim:

1. A truing tool comprising a shank having an end constituting a journal pin; a rotatable member including a gage plate formed with a bearing point, said rotatable member mounted on said journal pin; a spring member controlling said gage plate whereby the latter is held to bear on the surface of the work being tested; yielding means for securing said rotatable member in place on said journal pin but permitting it to be forcibly rotated; a pointer mounted on said rotatable member; and a dial mounted on the shank.

2. A truing tool comprising a shank having an end constituting a journal pin; a rotatable member including a gage plate formed with a bearing point, said rotatable member mounted on said journal pin; a spring member controlling said gage plate whereby the latter is held to bear on the surface of the work being tested; yielding means for securing said rotatable member in place on said journal pin but permitting it to be forcibly rotated; a pointer mounted on said rotatable member, said pointer being circumferentially adjustable on said rotatable member; and a dial mounted on the shank, said dial supported by means adapted to permit the circumferential adjustment of the dial.

3. A truing tool comprising a shank having its opposite ends formed into journal pins, the latter bent at different angles with respect to the shank; a rotatable member including a gage plate formed with a bearing point, said rotatable member mounted on one of said journal pins; a spring member controlling said gage plate whereby the latter is held to bear on the surface of the work being tested; yielding means for removably securing said rotatable member in place on said journal pin but permitting it to be forcibly rotated; a pointer mounted on said rotatable member; and a dial removably mounted on the shank.

4. A truing tool comprising a shank having its opposite ends formed into journal pins, the latter bent at different angles with respect to the shank; a rotatable member including a gage plate formed with a bearing point, said rotatable member mounted on one of said journal pins; a spring member controlling said gage plate whereby the latter is held to bear on the surface of the work being tested; yielding means for removably securing said rotatable member in place on said journal pin but permitting it to be forcibly rotated; a pointer mounted on said rotatable member, said pointer being circumferentially adjustable on said rotatable member; and a dial removably mounted on the shank, said dial supported by means adapted to permit the circumferential adjustment of the dial.

5. A truing tool comprising a shank having an end constituting a journal pin; a rotatable member including a gage plate formed with a bearing point, said rotatable member mounted on said journal pin; a spring arm adjustably engaged with said gage plate whereby the bearing point of the latter is held to the surface of the work being tested; said gage plate being formed with a plurality of radial notches for receiving the extremity of said spring arm; yielding means for securing said rotatable member in place on said journal pin but permitting it to be forcibly rotated; a pointer mounted on said rotatable member; and a dial mounted on the shank.

6. A truing tool comprising a shank having its opposite ends formed into journal pins, the latter bent at different angles with respect to the shank; a rotatable member including a gage plate formed with a bearing point, said rotatable member mounted on one of said journal pins; a spring arm adjustably engaged with said gage plate whereby the bearing point of the latter is held to the surface of the work being tested; said gage plate being formed with a plurality of radial notches for receiving the extremity of said spring arm; yielding means for removably securing said rotatable member in place on said journal pins but permitting it to be forcibly rotated; a pointer mounted on said rotatable member; and a dial removably mounted on the shank.

7. A truing tool comprising a shank having its opposite ends formed into journal pins, the latter bent at different angles with respect to the shank; a rotatable member including a gage plate formed with a bearing point, said rotatable member mounted on one of said journal pins; a spring arm adjustably engaged with said gage plate whereby the bearing point of the latter is held to the surface of the work being tested; said gage plate being formed with a plurality of radial notches for receiving the extremity of said spring arm; yielding means for removably securing said rotatable member in place on said journal pins but permitting it to be forcibly rotated; a pointer mounted on said rotatable member, said pointer being circumferentially adjustable on said rotatable member; and a dial removably mounted on the shank, said dial supported by means adapted to permit the circumferential adjustment of the dial.

8. A truing tool comprising a shank having an end constituting a journal pin, a sleeve mounted on said journal pin, a gage plate on said sleeve, said gage plate formed with a bearing point, a spring member adjustably engaged with said gage plate and adapted for holding the bearing point of the latter on the work being tested, said sleeve formed with a reduced end and a collar spaced apart from the shoulder of such reduced end; means yieldingly holding the sleeve in place on the journal pin but permitting it to be forcibly rotated on the latter; a pointer rotatably clamped between said shoulder and collar on said sleeve; and a dial affixed on the shank, said dial supported by means adapted to permit the circumferential adjustment of the dial.

CHARLES FREDOLIN URBAN.

Witnesses:
NICHOLAS BINTZ,
ANTON OELBERGER.

Copies of this patent may be obtained for five cents each, by addressing the "Commissioner of Patents, Washington, D. C."